(12) United States Patent
Makino

(10) Patent No.: US 8,757,132 B2
(45) Date of Patent: Jun. 24, 2014

(54) FUEL VAPOR PROCESSORS

(75) Inventor: Katsuhiko Makino, Aichi-ken (JP)

(73) Assignee: Aisan Kogyo Kabushiki Kaisha, Obu-Shi, Aichi-Ken (JP)

( * ) Notice: Subject to any disclaimer, the term of this patent is extended or adjusted under 35 U.S.C. 154(b) by 635 days.

(21) Appl. No.: 13/042,491

(22) Filed: Mar. 8, 2011

(65) Prior Publication Data

US 2011/0214646 A1  Sep. 8, 2011

(30) Foreign Application Priority Data

Mar. 8, 2010 (JP) ................................. 2010-050211
Mar. 10, 2010 (JP) ................................. 2010-053047

(51) Int. Cl.
*F02M 33/08* (2006.01)
*F02M 33/02* (2006.01)

(52) U.S. Cl.
USPC .......................................... 123/519; 123/514

(58) Field of Classification Search
USPC ......... 123/519, 518, 516, 520, 521, 514, 698; 220/746, 749; 137/587, 588, 589
See application file for complete search history.

(56) References Cited

U.S. PATENT DOCUMENTS 6,786,207 B2 * 9/2004 Kojima et al. ................. 123/516
7,261,092 B1 * 8/2007 Oku et al. ...................... 123/516
2007/0044549 A1 * 3/2007 Yoshioka et al. ............ 73/118.1
2010/0288242 A1 * 11/2010 Makino et al. ................ 123/521
2011/0247595 A1 * 10/2011 Ogita et al. ................... 123/521

FOREIGN PATENT DOCUMENTS

| JP | 06074118 A | * | 3/1994 | ............. F02M 37/00 |
| JP | 11-093784 | | 4/1999 | |
| JP | 2004-346745 A | | 12/2004 | |
| JP | 2005-36756 A | | 2/2005 | |
| JP | 2010-265859 | | 11/2010 | |

OTHER PUBLICATIONS

Non-English action dated Apr. 16, 2013 for Application No. JP 2010-053047 and an English language version.
Machine translation of JP 11-093784.
Patent Abstracts of Japan English abstract of JP 2004-346745 A.
Patent Abstracts of Japan English abstract of JP 2005-36756 A.

* cited by examiner

*Primary Examiner* — Mahmoud Gimie
(74) *Attorney, Agent, or Firm* — Ladas & Parry LLP

(57) ABSTRACT

A fuel vapor processor has a fuel tank configured to reserve fuel, a canister containing adsorbent capable of adsorbing fuel vapor vaporized in the fuel tank, a separator receiving a fuel vapor containing gas from the fuel tank, a regulator controlling the volume of the fuel vapor containing gas supplied to the separator, and a suction unit capable of removing the fuel vapor from the canister. The separator selectively passes the fuel vapor therethrough in order to divide the fuel vapor containing gas into a first gas mainly containing the fuel vapor and a second gas having a fuel vapor density lower than the first gas. The suction unit suctions the first gas from the separator in order to return the first gas into the fuel tank. The second gas is introduced into the canister or is released into the atmosphere.

12 Claims, 11 Drawing Sheets

FUEL VAPOR PROCESSORS

This application claims priority to Japanese Patent Application Serial Numbers 2010-050211 and 2010-053047, the contents of which are incorporated herein by reference.

BACKGROUND OF THE INVENTION

1. Field of the Invention

The present invention relates to fuel vapor processors, in particularly to fuel vapor processors mounted on a gas vehicle for preventing a large volume of fuel vapor from flowing into the atmosphere.

2. Description of the Related Art

A fuel vapor processor generally has a canister temporarily trapping fuel vapor vaporized in a fuel tank, a suction unit suctioning the fuel vapor from the canister, and a separator selectively passing the fuel vapor in a fuel vapor containing gas in order to concentrate the fuel vapor. The concentrated fuel vapor is returned into the fuel tank due to action of the suction unit.

Japanese Laid-Open Patent Publication No. H11-93784 discloses a fuel vapor processor where fuel vapor vaporized in a fuel tank is introduced into a liquefier and then the fuel vapor passing through the liquefier is introduced into and trapped in a canister. The fuel vapor temporarily trapped in the canister is suctioned due to suctioning power generated by a suctioning pump as a suction unit and is removed from the canister. Between the canister and the suctioning pump, a separation membrane as a separator is provided in order to concentrate the fuel vapor. The concentrated fuel gas (mainly containing fuel vapor) is flowed into the fuel tank via the liquefier. This fuel vapor processor is called as purge-less evaporation system where the fuel vapor is not purged into an engine and is returned into the fuel tank. The canister has an air communicating port communicated with the atmosphere such that a diluted fuel gas (mainly including air and not passing through the separation membrane) is introduced into the canister through the air communicating port together with ambient air.

The separation membrane cannot separate the fuel vapor from air completely. Separation performance of the separation membrane varies depending on a flow volume of the fuel vapor containing gas supplied to the separation membrane. As the flow volume of the gas supplied to the separation membrane increases, a concentration of the fuel vapor in the diluted gas also increases. In detail, as the gas volume supplied to the separation membrane increases, the volume of the fuel vapor required to be processed per unit of time increases. Therefore, when the very large amount of the fuel vapor is supplied to the separation membrane, it is difficult to pass the supplied fuel vapor through the separation membrane completely. Here, the volume of the gas supplied to the separation membrane is equal to a total volume of the diluted gas and the concentrated gas. Thus, when the flow volume of the concentrated gas increases, the density of the fuel vapor in the diluted gas decreases and the flow volume of the diluted gas decreases. Accordingly, when the flow volume of the fuel vapor separated from the fuel vapor containing gas increases, the volume of the diluted gas not passing through the separation membrane decreases.

The fuel vapor processor disclosed in Japanese Laid-Open Patent Publication No. H11-93784 does not have a regulator configured to control the amount of the fuel vapor containing gas supplied to the separation membrane (separator). In this case, the volume of the fuel vapor in the diluted gas varies depending on the volume of the fuel vapor containing gas supplied to the separation membrane. So, when the diluted gas contains the large volume of the fuel vapor and is introduced into the canister through the air communicating port, the large volume of the fuel vapor in the diluted gas mainly adsorbs onto adsorbent, which is contained in the canister and disposed near the air communicating port. Then, when the fuel vapor processor (suction pump) is stopped, some of the fuel vapor trapped near the air communicating port can flow into the atmosphere through the air communicating port.

In addition, in a condition that the fuel vapor processor is stopped, a slight amount of the diluted gas can be generated from the separation membrane, and such diluted gas is not introduced into the canister and is released into the atmosphere.

In the fuel vapor processor, the diluted gas can be introduced into the engine instead of into the canister. In such case, because the concentration of the fuel vapor in the diluted gas is not constant, fuel-air ratio in the engine is not fixed. Thus, there is a need for improved fuel vapor processors.

SUMMARY OF THE INVENTION

It is, accordingly, one object of the present teachings to provide improved fuel vapor processors capable of controlling the gas volume supplied to the separator.

In one aspect of the present teachings, a fuel vapor processor has a fuel tank configured to reserve fuel, a canister containing adsorbent capable of adsorbing fuel vapor vaporized in the fuel tank, a separator receiving a fuel vapor containing gas from the fuel tank, a regulator controlling the volume of the fuel vapor containing gas supplied to the separator, and a suction unit capable of removing the fuel vapor from the canister. The separator selectively passes the fuel vapor therethrough in order to divide the fuel vapor containing gas into a first gas mainly containing the fuel vapor and a second gas having a fuel vapor density lower than the first gas. The suction unit suctions the first gas from the separator in order to return the first gas into the fuel tank. The second gas is introduced into the canister or is released into the atmosphere.

In accordance with this aspect, it is able to stabilize a separation ability of the separator and to control the fuel vapor remaining density in the second gas. That is, the volume of the fuel vapor containing gas supplied to the separator is controlled such that the fuel vapor remaining density in the second gas is less than a predetermined value. For example, it is able to decrease the density (e.g., less than 1% by volume) such that the second gas contains little fuel vapor. Accordingly, when introducing the second gas into the canister for removing the fuel vapor from the canister, it is able to prevent the canister from trapping the large volume of the fuel vapor at an area near its air communicating port. In addition, in a case that the second gas is released into the atmosphere, it is able to control the fuel vapor remaining density in the second gas in order to prevent air pollution.

In a second aspect of the present teachings, a fuel vapor processor for a gas vehicle having an engine has a fuel tank reserving fuel, a canister containing adsorbent capable of adsorbing fuel vapor vaporized in the fuel tank, a separator receiving a fuel vapor containing gas from the fuel tank, a sensor measuring internal pressure of the fuel tank, a regulator, a suction unit capable of removing the fuel vapor from the canister, and an air intake pipe for supplying air to the engine. The separator selectively passes the fuel vapor therethrough in order to divide the fuel vapor containing gas into a first gas mainly containing the fuel vapor and a second gas having a fuel vapor density lower than the first gas. The regulator controls the volume of the fuel vapor containing gas supplied to the separator depending on the internal pressure of the fuel tank such that the fuel vapor density in the second gas is constant. The suction unit suctions the first gas from the separator in order to return the first gas into the fuel tank. The second gas is introduced into the air intake pipe In accordance with the second aspect, the gas volume supplied to the separator is controlled in order to stabilize the fuel vapor remaining density in the second gas, i.e., in order to keep the fuel vapor remaining density in the second gas at a preferred value. Thus, when introducing the second gas into the air intake pipe, fuel-air ratio for the engine is constant, thereby avoiding increase in emissions contained in exhaust.

DETAILED DESCRIPTION OF THE INVENTION

Each of the additional features and teachings disclosed above and below may be utilized separately or in conjunction with other features and teachings to provide improved fuel vapor processors. Representative examples of the present invention, which examples utilized many of these additional features and teachings both separately and in conjunction with one another, will now be described in detail with reference to the attached drawings. This detailed description is merely intended to teach a person of skilled in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
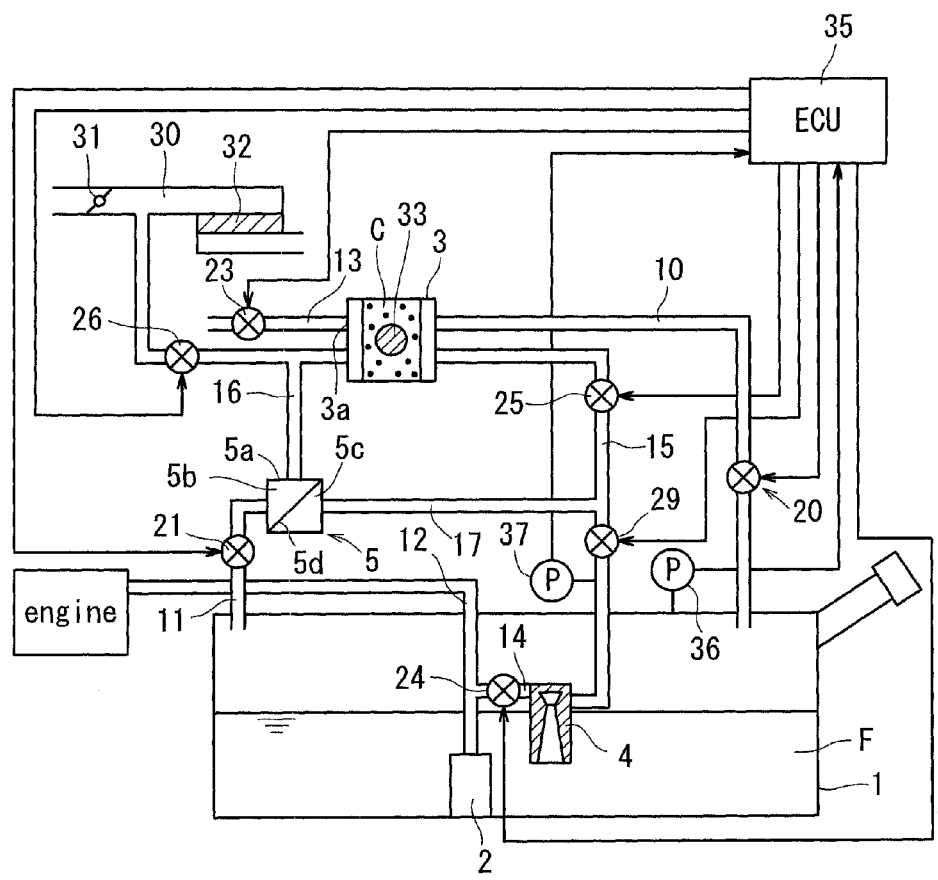
FIG. 1 is a schematic view of a fuel vapor processor according to a first embodiment.

As shown in FIG. 1, a fuel vapor processor has a fuel tank 1 configured to reserve liquid fuel F, a fuel pump 2 pumping the fuel F from the fuel tank 1 into an engine, a canister 3 temporarily trapping fuel vapor vaporized in the fuel tank 1, an aspirator 4 suctioning and removing the fuel vapor from the canister 3, a separation membrane module 5 selectively allowing the fuel vapor in a fuel vapor containing gas to pass therethrough, a first introducing pipe 10 configured to introduce the fuel vapor containing gas from the fuel tank 1 into the canister 3, and a second introducing pipe 11 configured to introduce the fuel vapor containing gas from the fuel tank 1 into the separation membrane module 5. The aspirator 4 is one kind of the suction units of this disclosure. The separation membrane module 5 is one kind of the separators of this disclosure.

The fuel tank 1 is composed of a closed container. The fuel pump 2 is disposed in the fuel tank 1 and pumps the fuel F into the engine through the fuel supply pipe 12. The canister 3 is filled with adsorbent C. As the adsorbent C, activated carbon or the like capable of passing air therethrough and removably adsorbing the fuel vapor can be used. The canister 3 has a heater 33 for heating the adsorbent C. As the temperature of the adsorbent C increases, the amount of target compound (i.e., fuel vapor in this teaching) adsorbed by the adsorbent C decreases. On the contrary, as the temperature of the adsorbent C decreases, the amount of the target compound adsorbed by the adsorbent C increases. Accordingly, when the fuel vapor is desorbed from the adsorbent C, the temperature of the adsorbent C is preferably as high as possible. However, when the fuel vapor is detached from the adsorbent C, the temperature of the adsorbent C decreases due to vaporization heat of the fuel vapor. Thus, when the fuel vapor is detached from the adsorbent C, the heater 33 heats the adsorbent C in order to increase detaching efficiency. The fuel tank 1 and the canister 3 are communicated with each other via the first introducing pipe 10. The first introducing pipe 10 has a first introducing pipe valve 20 configured to open and close in order to control fluid flow through the first introducing pipe 10. The canister 3 has an air communicating port 3a connected to an air communicating pipe 13, an end of which is communicated with the atmosphere. The air communicating pipe 13 has an air communicating pipe valve 23 configured to open and close in order to control fluid flow through the air communicating pipe 13. The fuel tank 1 has a pressure sensor 36 as internal pressure sensor for measuring an internal pressure of the fuel tank 1.

The fuel supply pipe 12 is connected to one end of a branch pipe 14 at a central region of the fuel supply pipe 12, and another end of the branch pipe 14 is connected to the aspirator 4. The branch pipe 14 has a branch pipe valve 24 as fuel introduction regulator configured to open and close in order to control fuel supply into the aspirator 4. The aspirator 4 is connected to a recovery pipe 15 communicating with the canister 3. The recovery pipe 15 has a first recovery pipe valve 25 positioned near the canister 3 and a second recovery pipe valve 29 positioned near the aspirator 4. The first and the second recovery pipes 25 and 29 open and close in order to control fluid flow through the recovery pipe 15, respectively. The aspirator 4 is communicated with the canister 3 via the recovery pipe 15. The recovery pipe 15 has a negative pressure sensor 37 between the aspirator 4 and the second recovery pipe valve 29 as negative pressure detector for measuring negative pressure generated by the aspirator 4. Here, as for the negative pressure sensor 37, a same type sensor as the pressure sensor 36 can be used.

Figure 2:
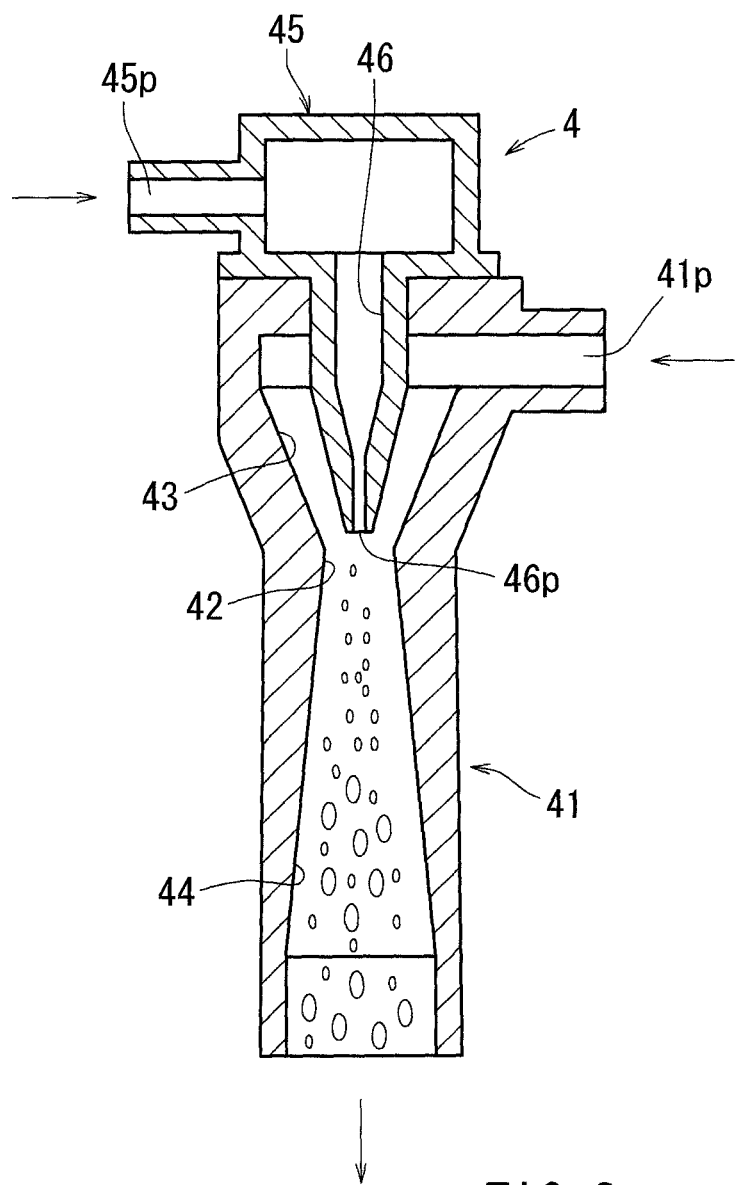
FIG. 2 is a vertical cross-sectional view of an aspirator.

As shown in FIG. 2, the aspirator 4 is composed of a venturi part 41 and a nozzle part 45. The venturi part 41 has a narrowed portion 42, a decompression chamber 43 disposed at an upstream side in a fuel flowing direction and having an inner space narrowing toward the narrowed portion 42, a diffuser portion 44 disposed at a downstream side in the fuel flowing direction and having an inner space broadening along the fuel flowing direction, and a suction port 41p. The decompression chamber 43, the narrowed portion 42 and the diffuser portion 44 are positioned concentrically. The suction port 41p is communicated with the decompression chamber 43. The suction port 41p is connected to the recovery pipe 15. The nozzle part 45 is engaged with the venturi part 41 at the upstream side in the fuel flowing direction. The nozzle part 45 has an introducing port 45p configured to introduce the fuel into the aspirator 4 and a nozzle body 46 configured to produce a jet of the introduced fuel. The introducing port 45p is connected to the branch pipe 14. The nozzle body 46 is housed in the decompression chamber 43 concentrically such that a nozzle orifice 46p of the nozzle body 46 faces the narrowed portion 42.

Some of the fuel F discharged from the fuel pump 2 is flowed through the fuel supply pipe 12, the branch pipe 14 and the introducing port 45p and then into the aspirator 4. Then, the introduced fuel F is injected from the nozzle body 46 and is flowed through the narrowed portion 42 and the diffuser portion 44 along an axial direction at high speed. In this state, negative pressure is generated due to venturi effect in the decompression chamber 43. Thus, such negative pressure provides suction power at the suction port 41p and the recovery pipe 15. Gas (fuel vapor from the canister 3 and air in this teaching) is suctioned through the recovery pipe 15 and into the suction port 41p and then is mixed with the fuel F injected from the nozzle body 46 and discharged from the diffuser portion 44.

The separation membrane module 5 is composed of a sealed container 5a, and a separation membrane 5d disposed in the sealed container 5a in order to divide an inner space of the sealed container 5a into a receiving chamber 5b and a permeation chamber 5c. The separation membrane 5d is composed of a known membrane, which has a high diffusion coefficient and a high solubility coefficient with respect to fuel component and is capable of selectively allowing the fuel compound to pass therethrough and substantially preventing air from passing therethrough. The receiving chamber 5b of the separation membrane module 5 is connected to the second introducing pipe 11. That is, the fuel tank 1 and the receiving chamber 5b of the separation membrane module 5 are communicated with each other via the second introducing pipe 11. The second introducing pipe 11 has a second introducing pipe valve 21 configured to open and close in order to control fluid flow through the second introducing pipe 11. The receiving chamber 5b of the separation membrane module 5 is connected to an end of a diluted gas pipe 16 for flowing a diluted gas that has not passed through the separation membrane 5d and remains in the receiving chamber 5b. The diluted gas pipe 16 is connected to an air intake pipe 30 at an opposite end and has a branched end connected to the canister 3. The air intake pipe 30 is configured to provide air into the engine during an engine operation. The air intake pipe 30 has a throttle valve 31 for controlling the amount of air flowing into the engine depending on an operation of an accelerator (not shown). The air intake pipe 30 has an air filter 32. The diluted gas pipe 16 has a decompression valve 26 between the air intake pipe 30 and the branching point of the diluted gas pipe 16. The decompression valve 26 is configured to open and close in order to control fluid flow through the diluted gas pipe 16. The permeation chamber 5c of the separation membrane module 5 is connected to an end of a concentrated gas pipe 17, which a concentrated gas separated by the separation membrane 5d flows through. The concentrated gas pipe 17 has an opposite end connected to the recovery pipe 15 between the first recovery pipe valve 25 and the second recover pipe valve 29.

Figure 4:
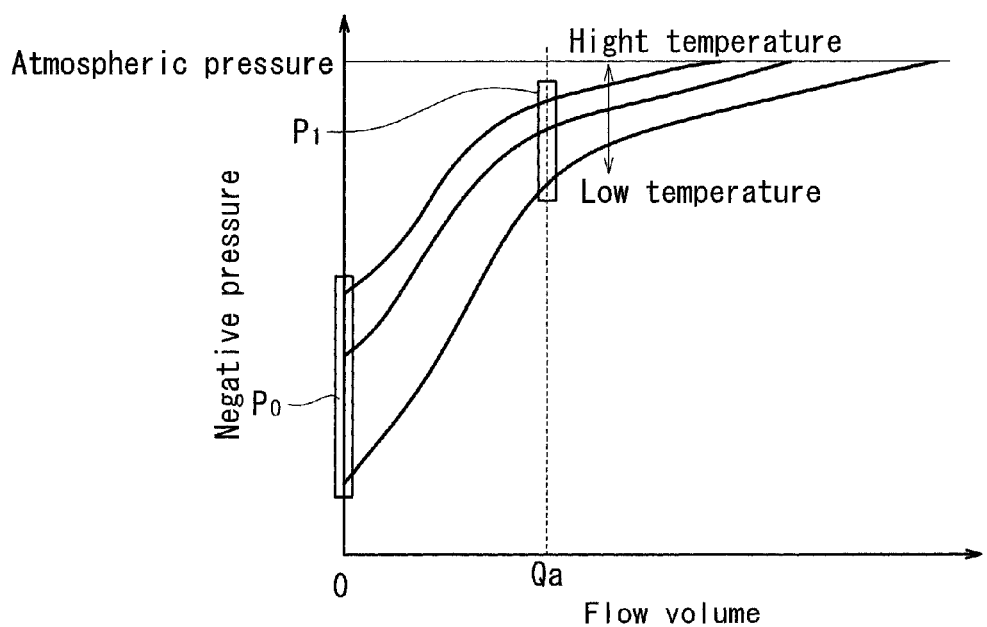
FIG. 4 is a graph showing negative pressure-flow characteristic of the aspirator.

The pressure sensor 36 and the negative pressure sensor 37 transmit signals to an engine control unit (ECU) 35. The ECU 35 has a central processing unit (CPU), a read-only memory (ROM), and a random access memory (RAM), etc. The ROM stores predefined control programs and data as for negative pressure-flow characteristic of the aspirator 4 depending on fuel characteristic as shown in FIG. 4, and the CPU computes and controls each element at predetermined timings based on the control programs and the negative pressure-flow characteristic of the aspirator 4. The first introducing pipe valve 20, the second introducing pipe valve 21, the air communicating pipe valve 23, the branch pipe valve 24, the first recovery pipe valve 25, the decompression valve 26 and the second recovery pipe valve 29 are composed of solenoid valves configured to be opened and closed by the ECU 35.

A treating mechanism of the fuel vapor by the fuel vapor processor will be described. During parking (off condition), the air communicating pipe valve 23 is opened, whereas the first introducing pipe valve 20, the second introducing pipe valve 21, the branch pipe valve 24, the first recovery pipe valve 25, the decompression valve 26 and the second recovery pipe valve 29 are closed. When refueling, the ECU 35 opens the first introducing pipe valve 20. Due to this, when refueling leads to increase in the internal pressure of the fuel tank 1, the fuel vapor containing gas in the fuel tank 1 flows through the first introducing pipe 10 and into the canister 3. Then, the adsorbent C in the canister 3 selectively adsorbs the fuel vapor in the fuel vapor containing gas. Remaining air passes through the adsorbent C and flows from the canister 3 through the air communicating pipe 13 and into the atmosphere. Accordingly, the fuel tank 1 is depressurized in order to prevent breakage of the fuel tank 1 without generating air pollution.

On the other hand, when the engine is running (the fuel pump 2 is running), the second introducing pipe valve 21, the branch pipe valve 24, the first recovery pipe valve 25 and the second recovery pipe valve 29 are opened, and the fuel vapor vaporized in the fuel tank 1 is separated and concentrated by the separation membrane module 5 and then is returned into the fuel tank 1. That is, the fuel vapor processor of this embodiment is one of the purge-less evaporation systems. Whereas, the diluted gas from the separation membrane module 5 is introduced into the canister 3 for desorbing the fuel vapor from the adsorbent C. In this state, the fuel vapor is recovered while controlling the flow rate of the fuel vapor containing gas supplied to the separation membrane module 5. Hereafter, a mechanism for recovering the fuel vapor while controlling the gas flow into the separation membrane module 5 will be described.

Figure 5:
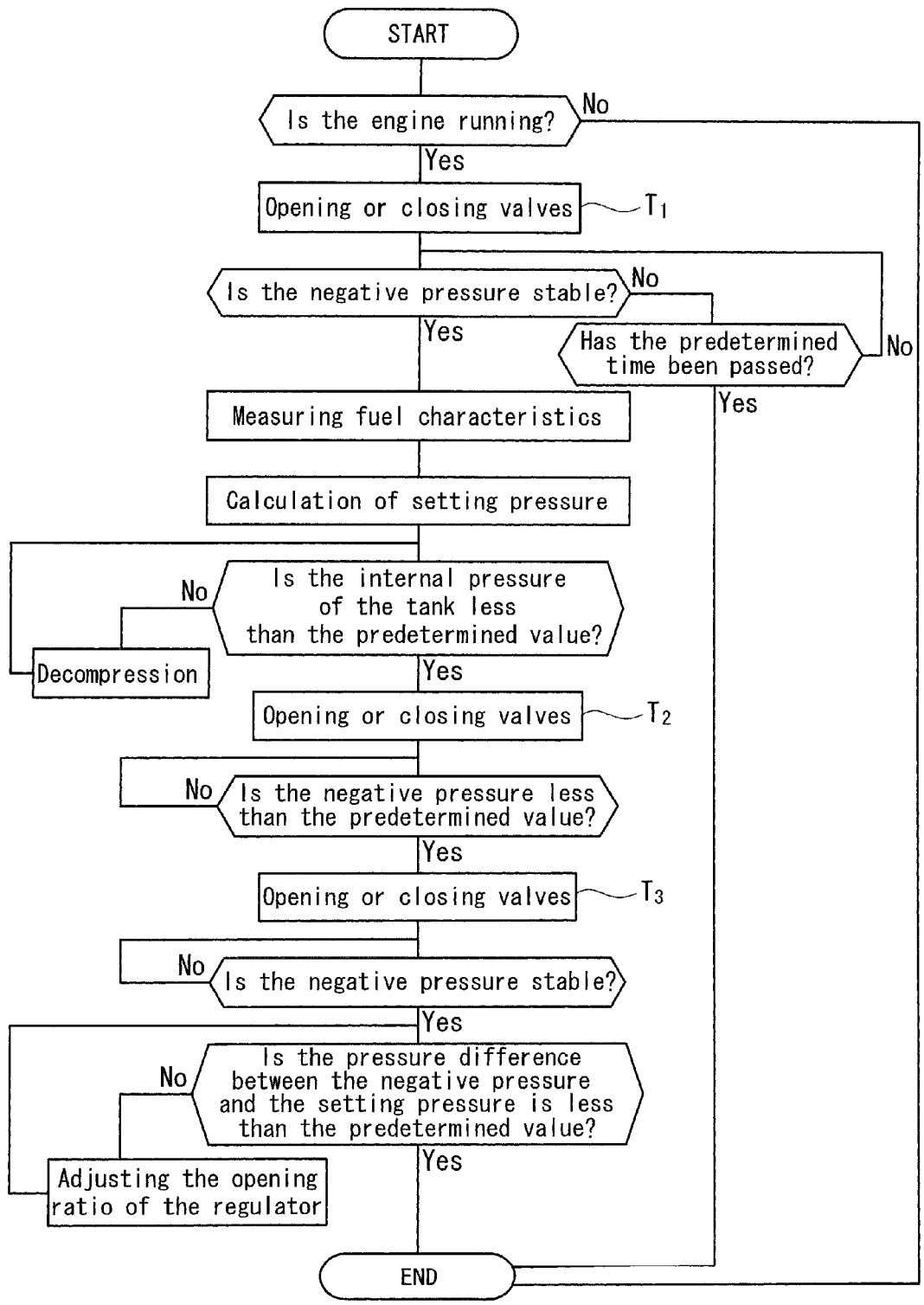
FIG. 5 is a control flow chart for processing a fuel vapor in the first embodiment.
Figure 6:
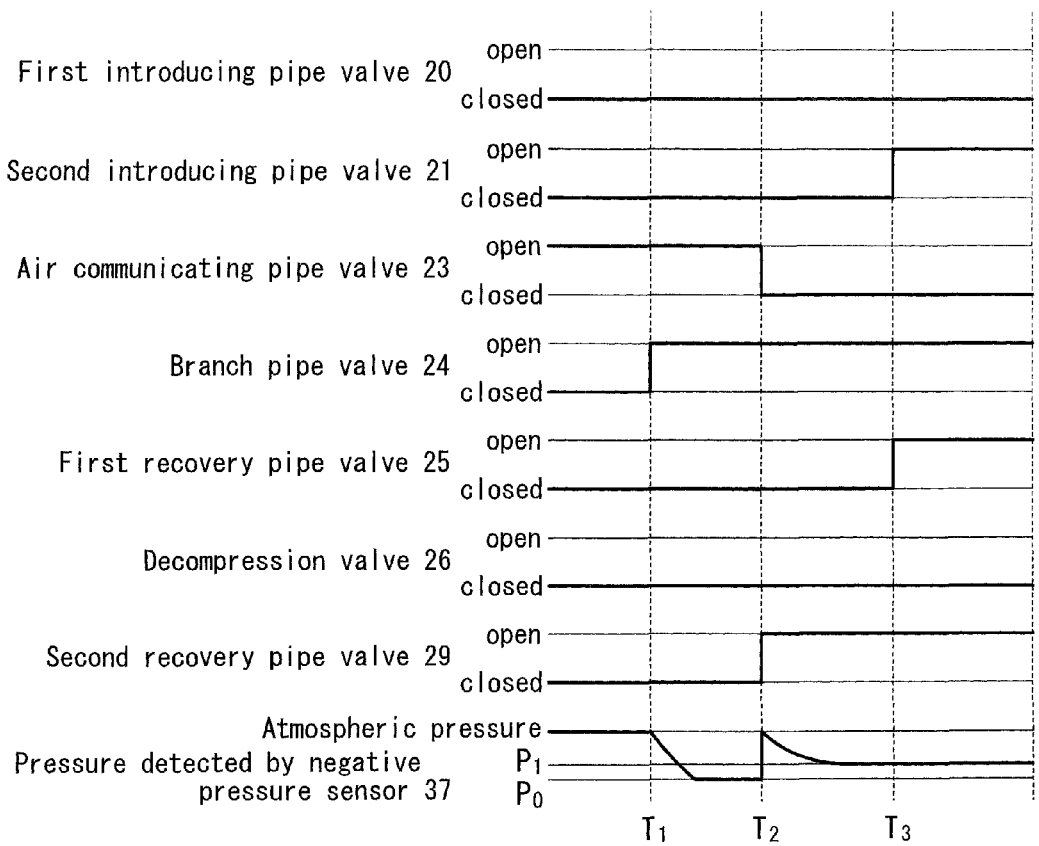
FIG. 6 is graphs showing timings for opening and closing valves and alteration of negative pressure in the first embodiment.

FIG. 5 shows a control flow chart of the fuel vapor processor for treating the fuel vapor. FIG. 6 shows timings for opening and closing each valve and alteration of pressure detected by the negative pressure sensor 37. Accordingly, explanation as for control steps relates to FIG. 5 and explanation as for opening-closing timings and alteration of negative pressure relates to FIG. 6. Firstly, it is determined whether conditions required for processing the fuel vapor are met or not. In this embodiment, the required condition is running of the engine. Here, when the engine is running, the fuel pump 2 is also working. When the engine is not running, the fuel vapor is not processed. Here, it is able to configure to process the fuel vapor when the engine stops, i.e., during parking. However, in a case that the fuel pump 2 works during parking, the fuel pump 2 consumes electric power not required for driving the engine, so that total electricity consumption increases. On the other hand, in another case that the fuel vapor is processed during running of the engine only, because only electricity required for driving the engine is consumed, such configuration is more efficient.

When the engine is running, predetermined valves are opened or closed in order to process the fuel vapor (at point $T_1$). At this point $T_1$, the branch pipe valve 24 is opened. Thus, some of the fuel F discharged from the fuel pump 2 is flowed through the fuel supply pipe 12 and the branch pipe 14 and into the aspirator 4. Then, the aspirator 4 generates negative pressure, so that the inner space of the recovery pipe 15 is kept at negative pressure. However, in this state, the second recovery pipe valve 29 remains closed. Accordingly, at this point $T_1$, only the inner space of the recovery pipe 15 between the aspirator 4 and the second recovery pipe valve 29 is decompressed. Because the second recovery pipe valve 29 is disposed between the aspirator 4 and a connection of the recovery pipe 15 and the concentrated gas pipe 17, a space between the aspirator 4 and the second recovery pipe valve 29 is closed such that any gas cannot flow into the space. Thus, the inner space of the recovery pipe 15 between the aspirator 4 and the second recovery pipe valve 29 is decompressed to a maximum negative pressure, which the aspirator 4 can provide. This maximum negative pressure is combined pressure (saturated pressure) $P_0$ of an internal negative pressure generated in the aspirator 4 and a fuel vapor pressure generated by vaporization of the fuel F that is introduced into the aspirator 4.

The negative pressure sensor 37 measures the negative pressure between the aspirator 4 and the second recovery pipe valve 29, and transmits signals to the ECU 35. Although the negative pressure sensor 37 is preferably operated consistently, it is able to make the negative pressure sensor 37 work periodically at predetermined intervals. When the negative pressure is not stable, the negative pressure sensor 37 repeatedly measures the negative pressure until the negative pressure becomes stable. When the negative pressure does not become stable after a predetermined period of time, it is determined that the fuel vapor processor can have leakage or breakdown, and the fuel vapor is not processed.

On the other hand, when the negative pressure becomes stable, such stable pressure value is inputted to the ECU 35 as the saturated pressure $P_0$. Then, the ECU 35 identifies fuel characteristic based on pre-stored data with respect to the negative pressure-flow characteristic of the aspirator 4 as shown in FIG. 4. The data includes various fuel characteristic, in detail, negative pressure-flow characteristic according to fuel temperature or fuel type. Therefore, the saturated pressure $P_0$ detected by the negative pressure sensor 37 is checked against the data relating to the negative pressure-flow characteristic in order to identify the fuel characteristic. For example, if the fuel temperature is high, the fuel vapor pressure is high and the saturated pressure $P_0$ is also high (the degree of the negative pressure is smaller), and the negative pressure-flow characteristic varies based on such saturated pressure $P_0$. On the other hand, if the fuel temperature is low, the fuel vapor pressure is low and the saturated pressure $P_0$ is also low (the degree of the negative pressure is larger), and the negative pressure-flow characteristic varies based on such saturated pressure $P_0$.

After detecting the saturated pressure $P_0$ based on the fuel characteristic, the ECU 35 determines a standard setting for controlling the volume of the fuel vapor containing gas supplied to the separation membrane module 5, i.e., the discharge volume from the aspirator 4. In this embodiment, the gas volume suctioned into the aspirator 4 is controlled in order to control the discharge volume from the aspirator 4. Therefore, in this embodiment, the ECU 35 stores data as for negative pressure-gas suction flow characteristic of the aspirator 4. Here, the discharge volume from the aspirator 4 is equal to a total volume of the fuel F introduced into the aspirator 4 and the gas suctioned into the aspirator 4. The fuel volume introduced into the aspirator 4 from the fuel pump 2 is generally constant. Accordingly, when the gas volume suctioned into the aspirator 4 is controlled, the discharge volume from the aspirator 4 is also controlled. To that end, it is necessary to control the negative pressure affecting the recovery pipe 15 and the concentrated gas pipe 17.

Figure 3:
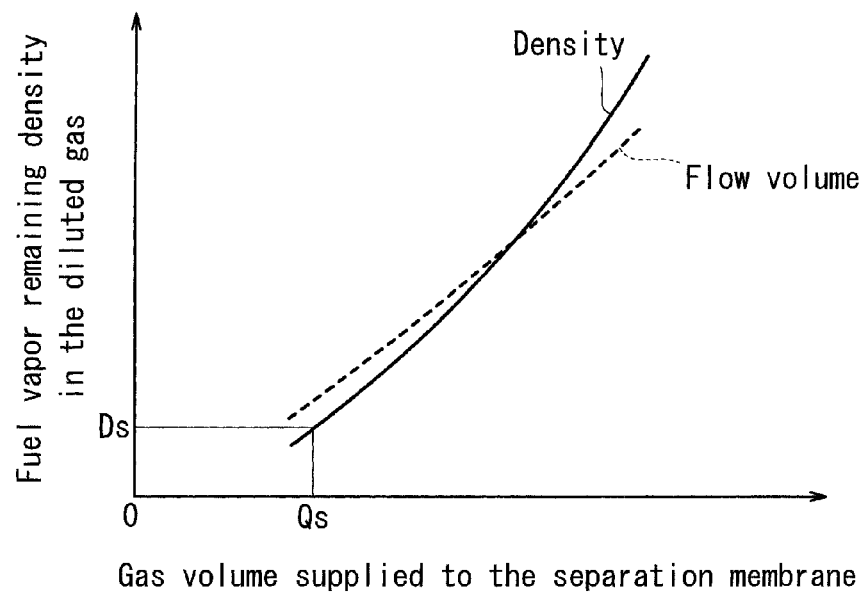
FIG. 3 is a graph showing relationship between the volume of a fuel vapor containing gas supplied to a separation membrane and a fuel vapor remaining density in the diluted gas.

A way of calculating this control negative pressure (setting negative pressure) will be described. Firstly, for calculating the setting negative pressure, the volume of the fuel vapor containing gas supplied to the separation membrane module 5 should be controlled such that the diluted gas contains little fuel vapor. To this end, the ECU 35 determines a standard supply quantity Qs corresponding to a standard remaining density Ds based on a known characteristic with respect to relationship between the flow volume of supplied gas and the remaining density of the fuel vapor as shown in FIG. 3. For example, the standard remaining density Ds may be less than 1% by volume. For reducing environmental load, the standard remaining density Ds is preferably as low as possible. When the standard supply quantity Qs to the separation membrane module 5 is determined, it is able to determine a standard flow quantity Qa for the aspirator 4 depending on the standard supply quantity Qs. The ECU 35 stores the predetermined standard flow quantity Qa. On that bases, the ECU 35 calculates a setting negative pressure $P_1$ depending on the standard flow quantity Qa based on the negative pressure-flow characteristic corresponding to the saturated pressure $P_0$ detected by the negative pressure sensor 37.

After the setting negative pressure $P_1$ affecting the recovery pipe 15 and the concentrated gas pipe 17 is calculated, the pressure sensor 36 measures the inner pressure of the fuel tank 1. When the pressure detected by the pressure sensor 36 is over a predetermined value (for example, 5 kPa), the second introducing pipe valve 21 and the decompression valve 26 are opened. Then, the gas in the fuel tank 1 flows into the air intake pipe 30, thereby decreasing the internal pressure of the fuel tank 1. In this state, although the diluted gas contains a large volume of the fuel vapor, because the fuel vapor is combusted in the engine, there is no problem as for air pollution.

On the other hand, when the pressure detected by the pressure sensor 36 is lower than the predetermined value, some of the valves are opened or closed to prepare for processing the fuel vapor (at point $T_2$). At this point $T_2$, the air communicating pipe valve 23 is closed and the second recovery pipe valve 29 is opened. Thus, the aspirator 4 decompresses the inner spaces of the concentrated gas pipe 17 and the recovery pipe 15 between the aspirator 4 and the first recovery pipe valve 25. The negative pressure sensor 37 measures the negative pressure in this state. When the measured negative pressure becomes less than the predetermined value (reference pressure), some of the valves are opened or closed for processing the fuel vapor (at point $T_3$). When the negative pressure affecting on the separation membrane 5d is more than the reference pressure, there is not sufficient pressure difference between the receiving chamber 5b and the permeation chamber 5c, which are divided by the separation membrane 5d. In this state, separation efficiency for the fuel vapor decreases, and it is not able to achieve the desired remaining density of the fuel vapor. This reference pressure at this point may be set at the setting pressure $P_1 \pm 1$ kPa approximately. When the reference pressure is not within this range, it is not able to reach the setting negative pressure $P_1$ immediately after starting the processing of the fuel vapor. Accordingly, there is a risk that some errors of the gas volume supplied to the separation membrane module 5 are observed after starting the processing of the fuel vapor. In the case that the reference pressure is within the setting pressure $P_1 \pm 1$ kPa approximately, it is able to accurately control the gas volume supplied to the separation membrane module 5 immediately after starting the processing.

At the point $T_3$, the second introducing pipe valve 21 and the first recovery pipe valve 25 are opened. The first recovery pipe valve 25 is repeatedly opened and closed at a high speed in order to control an opening ratio of the first recovery valve 25. In detail, a duty ratio defined by open time/(open time+ closed time) as for the first recovery pipe valve 25 is controlled such that the negative pressure in the recovery pipe 15 and the concentrated gas pipe 17 is equal to the setting negative pressure $P_1$. Thus, the first recovery pipe valve 25 works as pressure regulation valve. In this embodiment, the ECU 35 and the first recovery pipe valve 25 correspond to the regulator of this teaching.

When the first recovery pipe valve 25 is opened, the negative pressure affects on the canister 3. Thus, the fuel vapor is removed from the adsorbent C filled in the canister 3. The removed fuel vapor is suctioned into the aspirator 4 through the recovery pipe 15, and then is discharged into the fuel tank 1 together with the fuel F. On the other hand, because the second introducing pipe valve 21 is opened, the fuel vapor containing gas flows from the fuel tank 1 through the second introducing pipe 11 and into the receiving chamber 5b of the separation membrane module 5. Then, the fuel vapor in the fuel vapor containing gas passes through the separation membrane 5d and is separated in the permeation chamber 5c as the concentrated gas. The concentrated gas separated by the separation membrane 5d is suctioned into the aspirator 4 through the concentrated gas pipe 17 and the recovery pipe 15, and then is discharged into the fuel tank 1 together with the fuel F and the removed gas. The diluted gas, which has not passed through the separation membrane 5d and remains in the receiving chamber 5b, is introduced into the canister 3 through the diluted gas pipe 16 in order to remove the fuel vapor from the canister 3. Accordingly, it is able to facilitate detachment of the fuel vapor from the adsorbent C contained in the canister 3. In this state, because the first recovery pipe valve 25 working as pressure regulation valve controls the internal pressure of the recovery pipe 15 and the concentrated gas pipe 17 such that the internal pressures is kept at the setting pressure $P_1$, the gas volume suctioned into the aspirator 4 is led to the predetermined flow quantity Qa. This step controls the gas volume discharged from the aspirator 4, so that the gas volume supplied to the separation membrane module 5 reaches the standard flow quantity Qs. Therefore, the fuel vapor remaining density in the diluted gas is less than the standard remaining density Ds. That is, the diluted gas contains little fuel vapor. So, when the diluted gas is introduced into the canister 3, the adsorbent C disposed near the air communicating port 3a hardly adsorbs the fuel vapor.

During processing of the fuel vapor, the negative pressure sensor 37 measures the internal pressure of the recovery pipe 15 and the concentrated gas pipe 17. In a condition that the negative pressure is stable, the negative pressure measured by the pressure sensor 37 is compared with the setting negative pressure $P_1$, and when a pressure difference between the negative pressure and the setting negative pressure $P_1$ is larger than a predetermined value, the opening ratio of the first recovery pipe valve 25, i.e., its duty ratio is adjusted adequately. This predetermined value, which substantially corresponds to the pressure difference between the measured negative pressure and the setting negative pressure $P_1$, may be set at, e.g., 0.1 kPa. When the pressure difference between the negative pressure measured by the negative pressure valve 37 and the setting negative pressure $P_1$ is smaller than the predetermined value, it is able to continuously process the fuel vapor without adjustment. When the engine (fuel pump 2) is stopped, each valve is returned to its initial condition, and the processing of the fuel vapor is stopped. Here, during the processing of the fuel vapor, the pressure sensor 36 measures the internal pressure of the fuel tank 1. When the internal pressure of the fuel tank 1 is over a predetermined value (for example, 5 kPa) during processing of the fuel vapor, the decompression valve 26 is opened in order to make the gas in the fuel tank 1 flow into the air intake pipe 30. When the internal pressure of the fuel tank 1 decreases less than the predetermined value due to this decompression operation, the decompression valve 26 is closed.

Figure 7:
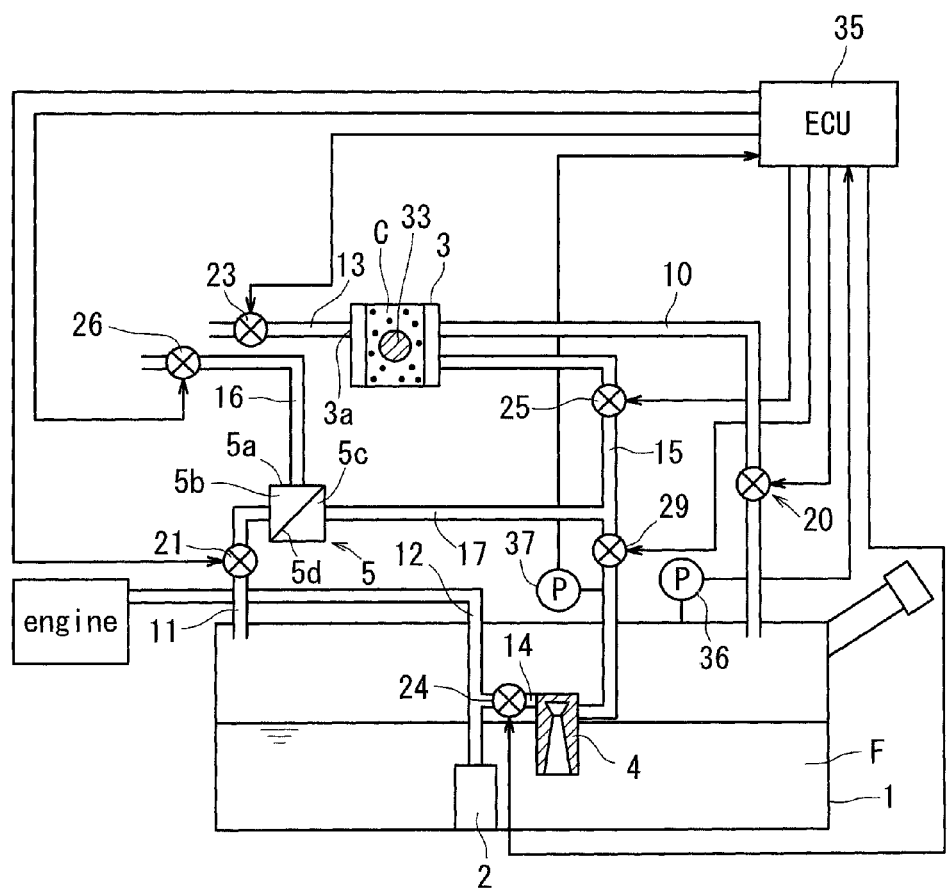
FIG. 7 is a schematic view of a fuel vapor processor according to a second embodiment.

A second embodiment will be described hereafter. The diluted gas is introduced into the canister 3 for removing the fuel vapor from the adsorbent C contained in the canister 3 in the first embodiment, whereas the diluted gas is released into the atmosphere in this second embodiment. FIG. 7 shows a schematic view of the fuel vapor processor of the second embodiment. Because the second embodiment substantially corresponds to a variant of the first embodiment, which further has some changes, such changes will be mainly described and same or similar configurations will not be described. As shown in FIG. 7, the end of the diluted gas pipe 16 is not connected to the canister 3 and opens to the atmosphere in the second embodiment. In this case, when the fuel vapor containing gas is supplied to the separation membrane module 5 from the fuel tank 1, the diluted gas not passing through the separation membrane 5d is released into the atmosphere through the diluted gas pipe 16. The diluted gas contains little fuel vapor in the same manner as the first embodiment, so that it is able to prevent air pollution.

The standard remaining density Ds of the second embodiment is preferably set even lower than the standard remaining density Ds of the first embodiment. In the first embodiment, because the diluted gas is essentially introduced into the canister 3, the small amount of the fuel vapor in the diluted gas does not cause serious problems. However, because the diluted gas is released into the atmosphere in the second embodiment, the fuel vapor in the diluted gas directly relates to air pollution. Accordingly, the standard remaining density Ds of the second embodiment is preferably set at 0.5% by volume, more preferably at 0.1% by volume.

In this second embodiment, the diluted gas is not used for removing the fuel vapor from the canister 3. Thus, the air communicating pipe valve 23 is opened during treatment of the fuel vapor in order to improve the removal efficiency of the fuel vapor. Due to this configuration, when the negative pressure generated in the aspirator 4 affects on the canister 3, ambient air is introduced into the canister 3 through the air communicating pipe 13, thereby facilitating removal of the fuel vapor. On the other hand, because the diluted gas is released into the atmosphere, there is no risk that the internal pressure of the fuel tank 1 excessively increases and causes breakage of the fuel tank 1. Thus, it is not necessary to decompress the fuel tank 1. A control flow for processing the fuel vapor in the second embodiment is similar to the control flow of the first embodiment, which is shown in FIG. 5, and a difference between these two control flows is whether there is the "decompression" step or not. Accordingly, the decompression valve 26 in the first embodiment is called as "diluted gas pipe valve" in the second embodiment. The diluted gas pipe valve 26 is opened together with the second introducing pipe valve 21 and the first recovery pipe valve 25 at the point $T_3$ in FIG. 6.

Figure 8:
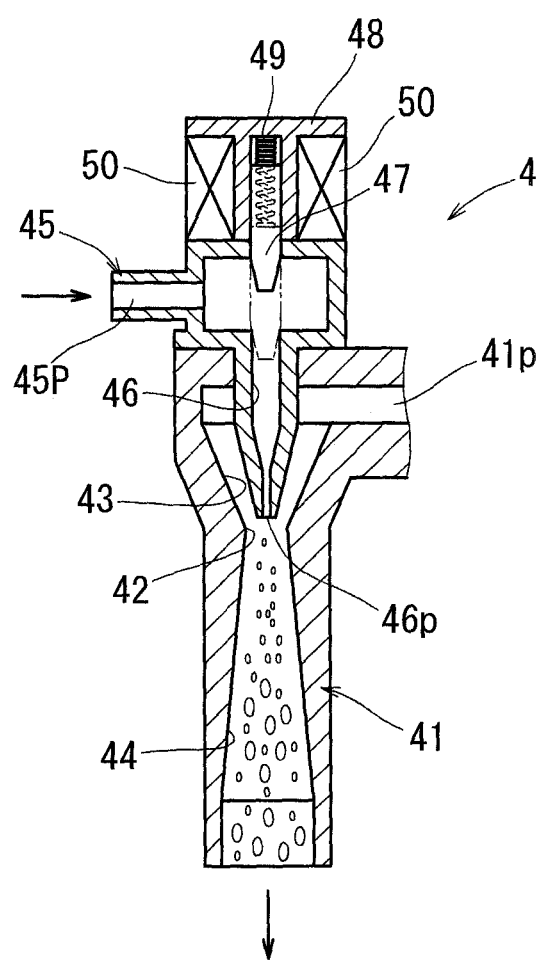
FIG. 8 is a vertical cross-sectional view of a variant of the aspirator.

In the first and the second embodiments, the fuel introduction regulator can be provided to the aspirator 4 instead of the branch pipe 14. For example, the aspirator 4 may have a needle valve for regulating timing for injection from the nozzle body 46. In detail, as shown in FIG. 8, the nozzle part 45 can be provided with a valve mount base 48, and a needle valve 47 capable of preventing a fluid from flowing through the nozzle body 46 can be disposed at a center region of the valve mount base 48. The needle valve 47 is formed in a pin shape and is configured to slidably move along an axial direction of the aspirator 4. Between the needle valve 47 and the valve mount base 48, a compression spring 49 is disposed such that the compression spring 49 biases the needle valve 47 toward a direction for closing an inner space of the nozzle body 46. The valve mount base 48 has an electromagnet 50 around the needle valve 47. When applying current to the electromagnet 50, the needle valve 47 is retracted such that the fluid can flow through the nozzle body 46.

Although the setting negative pressure $P_1$ is determined based on the negative pressure-gas suction flow characteristic of the aspirator 4 in the first and the second embodiments, the setting negative pressure $P_1$ may be determined based on the negative pressure-discharge flow characteristic. Because the fuel volume introduced into the aspirator 4 is constant, the negative pressure-discharge flow characteristic is similar to the negative pressure-gas suction flow characteristic. Here, it is able to regulate the discharge volume of the aspirator 4 by control of the fuel volume introduced into the aspirator 4. In this case, the fuel volume introduced into the aspirator 4 is controlled by opening the first recovery pipe valve 25 and controlling the duty ratio of the branch pipe valve 24 such that the negative pressure generated in the aspirator 4 is kept at the setting negative pressure $P_1$.

The degree of the negative pressure generated by the aspirator 4 essentially depends on the fuel volume introduced in to the aspirator 4. For example, as the fuel volume supplied to the aspirator 4 increases, the degree of the negative pressure increases. However, if the fuel volume introduced into the aspirator 4 is fixed, the degree of the negative pressure changes depending on fuel characteristic such as kind or temperature. The aspirator 4 generates the negative pressure due to venturi effect utilizing the introduced fuel. When the fuel is introduced into the aspirator 4 in order to generate the negative pressure, some of the introduced fuel is vaporized in the aspirator 4, thereby generating fuel vapor pressure. Thus, the negative pressure generated by the aspirator 4 (negative pressure affecting on the canister 3, etc.) is equal to a combined pressure of a negative pressure actually generated in the aspirator 4 and the fuel vapor pressure of the introduced fuel. The lighter the fuel is or the higher the fuel temperature is, the higher the fuel vapor pressure is. When the fuel vapor pressure alters in this way, the degree of the negative pressure generated by the aspirator 4 also alters. And, the gas volume suctioned into the aspirator 4 and the discharge amount from the aspirator 4 are determined based on the negative pressure generated by the aspirator 4. That is, the negative pressure-flow characteristic of the aspirator 4 varies depending on the characteristic (vapor pressure) of used fuel (refer to FIG. 4). On the contrary, when the fuel characteristic is determined, it is able to understand the negative pressure-flow characteristic of the aspirator 4.

Therefore, after determining the fuel characteristic (vapor pressure), the ECU 35 preferably controls the volume of the fuel vapor containing gas supplied to the separation membrane module 5 based on the negative pressure-flow characteristic of the aspirator 4. Due to this configuration, because it is able to control the gas volume supplied to the separation membrane module 5 depending on alteration of the fuel characteristic, the fuel vapor remaining density can be controlled appropriately. As described above, the discharge volume, the fuel introduction volume, and the gas suction volume of the aspirator 4 are correlative each other. Accordingly, the "flow" in the negative pressure-flow characteristic of the aspirator 4 may be discharge volume, the fuel introduction volume or the gas suction volume of the aspirator 4.

When the pressure regulation valve capable of controlling the gas volume suctioned into the aspirator 4 is used in order to control the discharge volume from the aspirator 4, the negative pressure generated by the aspirator 4 (negative pressure affecting on the canister 3, etc.) is controlled in order to control the gas volume suctioned into the aspirator 4. This configuration can control the discharge volume from the aspirator 4 and the gas volume supplied to the separation membrane module 5.

When the solenoid valve is used for the pressure regulation valve, it is able to control pressure by changing its duty ratio, i.e., open time/(open time+closed time). Although the pressure regulation valve can be composed of a motor-driven valve or the like capable of controlling opening area, i.e., opening area/(opening area+closed area) of the valve, the solenoid valve can control pressure more quickly and is more economical than the motor-driven valve or the like.

Figure 9:
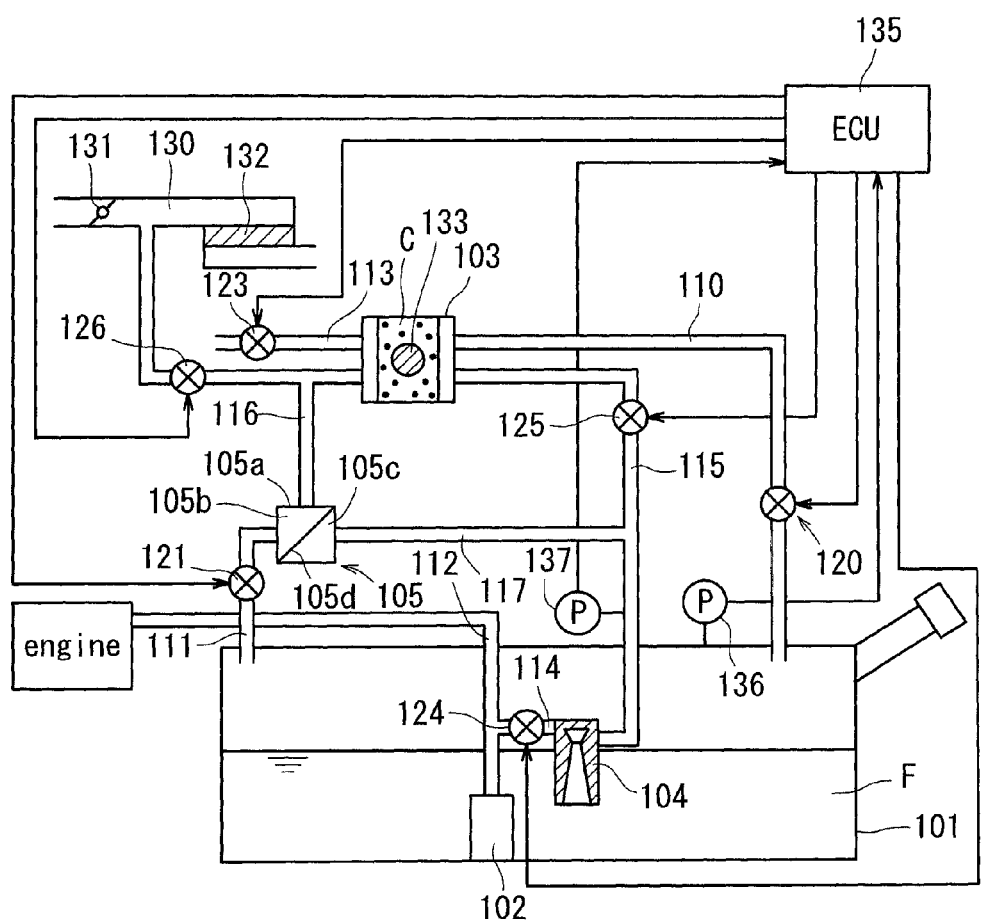
FIG. 9 is a schematic view of a fuel vapor processor according to a third embodiment.

A third embodiment will be described hereafter. FIG. 9 shows a schematic view of the fuel vapor processor of the third embodiment. In this embodiment, each of elements similar to those in the first and the second embodiments has a reference number similar to that of the first or the second embodiment. The fuel vapor processor has a fuel tank 101 configured to reserve liquid fuel F, a fuel pump 102 pumping the fuel F from the fuel tank 101 into an engine (not shown), a canister 103 temporarily trapping fuel vapor vaporized in the fuel tank 101, an aspirator 104 suctioning and removing the fuel vapor from the canister 103, a separation membrane module 105 selectively allowing the fuel vapor in the fuel vapor containing gas to pass therethrough, a first introducing pipe 110 configured to introduce the fuel vapor containing gas from the fuel tank 101 into the canister 103, and a second introducing pipe 111 configured to introduce the fuel vapor containing gas from the fuel tank 101 into the separation membrane module 105. The aspirator 104 and the separation membrane module 105 correspond to the suction unit and the separator of this disclosure, respectively.

The fuel tank 101 is sealed. The fuel pump 102 is disposed in the fuel tank 101 and pumps the fuel F into the engine through a fuel supply pipe 112. The canister 103 is filled with adsorbent C. As the adsorbent C, activated carbon or the like capable of passing air therethrough and removably adsorbing the fuel vapor can be used. The canister 103 has a heater 133 for heating the adsorbent C filled in the canister 103. As the temperature of the adsorbent C increases, the amount of target compound (fuel vapor in this teaching) adsorbed by the adsorbent C decreases. Whereas, as the temperature of the adsorbent C decreases, the amount of the target compound adsorbed by the adsorbent C increases. Accordingly, when removing the fuel vapor from the adsorbent C, the temperature of the adsorbent C is preferably as high as possible. However, when the fuel vapor is detached from the adsorbent C, the temperature of the adsorbent C decreases due to vaporization heat of the fuel vapor. Thus, when the fuel vapor is detached from the adsorbent C, the heater 133 heats the adsorbent C in order to increase detaching efficiency. The fuel tank 101 and the canister 103 are communicated with each other via the first introducing pipe 110. The first introducing pipe 110 has a first introducing pipe valve 120 configured to open and close in order to control fluid flow through the first introducing pipe 110. The canister 103 is connected to an air communicating pipe 113, an end of which is communicated with the atmosphere. The air communicating pipe 113 has an air communicating pipe valve 123 configured to open and close in order to control fluid flow through the air communicating pipe 113. The fuel tank 101 has a pressure sensor 136 as internal pressure sensor for measuring an internal pressure of the fuel tank 101.

The fuel supply pipe 112 is connected to one end of a branch pipe 114 at a central region of the fuel supply pipe 112, and an opposite end of the branch pipe 114 is connected to the aspirator 104. The branch pipe 114 has a branch pipe valve 124 as fuel introduction regulator configured to open and close in order to control fluid flow through the branch pipe 114 and fuel supply into the aspirator 104. The aspirator 104 is connected to a recovery pipe 115 communicating with the canister 103. The recovery pipe 115 has a recovery pipe valve 125 configured to open and close in order to control fluid flow through the recovery pipe 115. The aspirator 104 is communicated with the canister 103 via the recovery pipe 115. The recovery pipe 115 has a negative pressure sensor 137 between the aspirator 104 and the recovery pipe valve 125 as negative pressure detector for measuring negative pressure generated by the aspirator 104. Here, as for the negative pressure sensor 137, a same type sensor as the pressure sensor 136 can be used.

The aspirator 104 has the same configuration as the aspirator 4 in the first embodiment (refer to FIG. 2). So, detailed configuration of the aspirator 104 will not be explained.

The separation membrane module 105 is composed of a sealed container 105a, and a separation membrane 105d disposed in the sealed container 105a in order to divide an inner space of the sealed container 105a into a receiving chamber 105b and a permeation chamber 105c. The separation membrane 105d is composed of a known membrane, which has a high diffusion coefficient and a high solubility coefficient with respect to fuel component and is capable of selectively passing the fuel compound therethrough and substantially preventing air from passing therethrough. The receiving chamber 105b of the separation membrane module 105 is connected to the second introducing pipe 111. That is, the fuel tank 101 and the receiving chamber 105b of the separation membrane module 105 are communicated with each other via the second introducing pipe 111. The second introducing pipe 111 has a second introducing pipe valve 121 configured to open and close in order to control fluid flow through the second introducing pipe 111. The receiving chamber 105b of the separation membrane module 105 is connected to an end of a diluted gas pipe 116, which a diluted gas not passing through the separation membrane 105d and remaining in the receiving chamber 105b flows through. The diluted gas pipe 116 is connected to an air intake pipe 130 at its opposite end and has a branched end connected to the canister 103. The air intake pipe 130 is configured to provide air into the engine when the engine is running. The air intake pipe 130 has a throttle valve 131 for controlling an amount of air flowing into the engine depending on an operation of an accelerator (not shown). The air intake pipe 130 has an air filter 132. The diluted gas pipe 116 has a decompression valve 126 configured to open and close in order to control fluid flow through the diluted gas pipe 116 between the branching point of the diluted gas pipe 116 and the air intake pipe 130. The diluted gas pipe 116 is connected to the air intake pipe 130 between the throttle valve 131 and the air filter 132. The permeation chamber 105c of the separation membrane module 105 is connected to an end of a concentrated gas pipe 117, which a concentrated gas separated by the separation membrane 105d flows through. The concentrated gas pipe 117 has another end connected to the recovery pipe 115 between the recovery pipe valve 125 and the aspirator 104. Thus, the permeation chamber 105c of the separation membrane module 105 and the aspirator 104 are communicated with each other via the concentrated gas pipe 117 and the recovery pipe 115.

Figure 12:
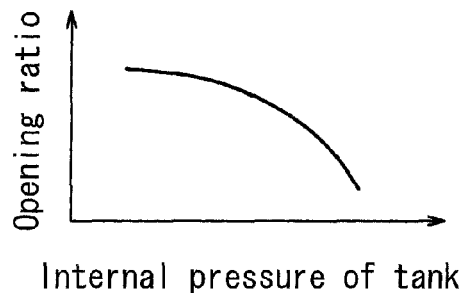
FIG. 12 is a graph showing relationship between the internal pressure of the fuel tank and the opening ratio of the flow control valve.

The pressure sensor 136 and the negative pressure sensor 137 transmit signals to an engine control unit (ECU) 135. The ECU 135 has a central processing unit (CPU), a read-only memory (ROM), and a random access memory (RAM), etc. The ROM stores control programs and data as for relationship between the internal pressure of the fuel tank 101 and an opening ratio of the second introducing pipe valve 121 as shown in FIG. 12, and the CPU controls each element at predetermined timings based on the control programs and the data. The first introducing pipe valve 120, the second introducing pipe valve 121, the air communicating pipe valve 123, the branch pipe valve 124, the recovery pipe valve 125, and the decompression valve 126 are composed of solenoid valves configured to be opened and closed by the ECU 135.

A mechanism of the fuel vapor processor for processing the fuel vapor will be described. During parking (off condition), the air communicating pipe valve 123 is opened, whereas the first introducing pipe valve 120, the second introducing pipe valve 121, the branch pipe valve 124, the recovery pipe valve 125, and the decompression valve 126 are closed. When refueling, the ECU 135 opens the first introducing pipe valve 120. Accordingly, refueling leads to increase in the internal pressure of the fuel tank 101, and thus the fuel vapor containing gas in the fuel tank 101 flows through the first introducing pipe 110 and into the canister 103. Then, the adsorbent C filled in the canister 103 selectively adsorbs the fuel vapor. Remaining air passes through the adsorbent C and flows from the canister 103 through the air communicating pipe 113 and then into the atmosphere. Thus, the fuel tank 101 is depressurized in order to prevent breakage of the fuel tank 101 while avoiding air pollution.

Figure 10:
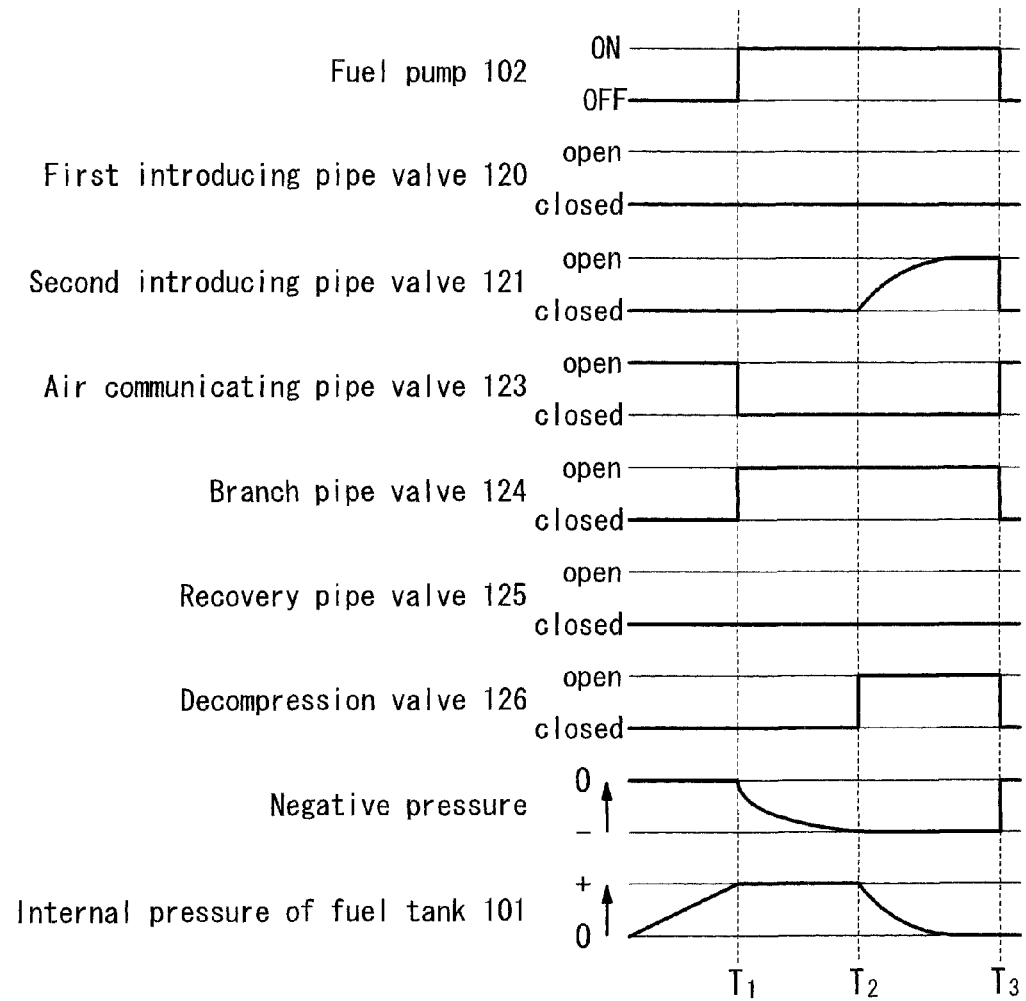
FIG. 10 is graphs showing timings for opening and closing valves and alteration of pressure in the third embodiment.
Figure 11:
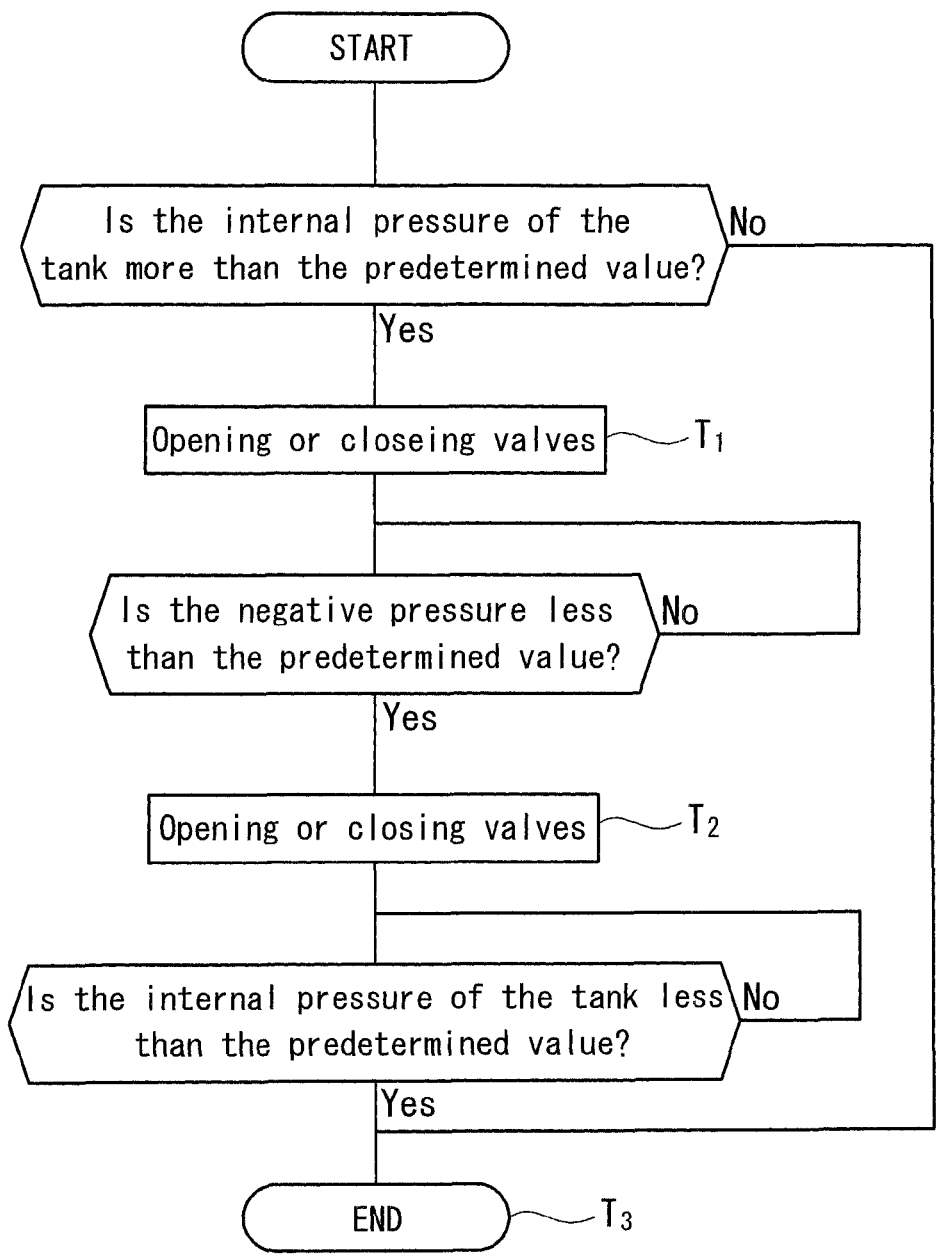
FIG. 11 is a control flow chart for decompression in the third embodiment.

During parking (in a shutdown condition of the engine) without refueling, the first introducing pipe valve 120 and the second introducing pipe valve 121 are closed, so that the fuel tank 101 is closed. Thus, because the fuel F in the fuel tank 101 vaporizes, the internal pressure of the fuel tank 101 gradually increases. And, when the internal pressure of the fuel tank 101 increases over a predetermined value, the fuel tank 101 is depressurized in order to prevent breakage of the fuel tank 101. Hereafter, decompression of the fuel tank 101 during shutdown of the engine will be described in detail. FIG. 10 shows timings for opening and closing each valve, changes in the internal pressure of the recovery pipe 115 and the concentrated gas pipe 117 (negative pressure affecting on the canister 103 and the separation membrane module 105) and changes in the internal pressure of the fuel tank 101 during the decompression operation in the shutdown condition of the engine. FIG. 11 shows a control flow for the decompression operation in the shutdown condition of the engine. In the following explanation as for the decompression, the ECU 35 controls the timings for opening and closing each valve and for running the fuel pump 102 and the like.

During shutdown of the engine, when the pressure sensor 136 detects the internal pressure of the fuel tank 101 over a predetermined value (reference pressure), the fuel pump 102 is driven and predetermined valves are opened or closed (at point $T_1$). Here, although the reference pressure is not limited to a specific value, the pressure must be set less than a value leading to breakage of the fuel tank 101, i.e., withstanding pressure of the fuel tank 101. For example, the reference pressure can be set at approximately 5 kPa depending on a kind of the fuel tank 101. At the point $T_1$, the air communicating pipe valve 123 is closed, whereas the branch pipe valve 124 is opened. Thus, some of the fuel F discharged from the fuel pump 102 is introduced into the aspirator 104 through the fuel supply pipe 112 and the branch pipe 114. Then, the aspirator 104 generates negative pressure, so that the inner space of the recovery pipe 115 is depressurized. At this time, because the recovery pipe valve 125 is still closed, the negative pressure does not affect on the canister 103. The concentrated gas pipe 117 is connected to the recovery pipe 115 between the recovery pipe valve 125 and the aspirator 104, so that the concentrated gas pipe 117 is depressurized together with the recovery pipe 115. Accordingly, the negative pressure affects on the permeation chamber 105*c* of the separation membrane module 105. Because the decompression valve 126 is also closed at the point $T_1$, the fuel tank 101 is not depressurized. In addition, because the engine is not running, a pressure regulator (not shown) returns the fuel F, which has been discharged from the fuel pump 102 and has not been introduced into the aspirator 104, into the fuel tank 101.

When the negative pressure sensor 137 detects the pressure in the recovery pipe 115 and the concentrated gas pipe 117 more than another reference pressure, the second introducing pipe valve 121 and the decompression valve 126 are opened (at point $T_2$). This reference pressure is also not limited to a specific value and can be set at any value. The reference pressure is preferably determined such that there is an appropriate pressure difference between the receiving chamber 105*b* and the permeation chamber 105*c* of the separation membrane module 105. Accordingly, it is preferable that the reference pressure is as low as possible, i.e., the degree of the negative pressure is larger. For example, the reference pressure can be set at approximately −5 kPa or can be set at a maximum negative pressure (saturated negative pressure) generated by the aspirator 104.

When the second introducing pipe 121 and the decompression valve 126 are opened, the fuel vapor containing gas generated in the fuel tank 101 is introduced into the receiving chamber 105*b* of the separation membrane module 105 through the second introducing pipe 111. Then, the fuel vapor in the fuel vapor containing gas selectively passes through the separation membrane 105*d*, so that a concentrated gas (mainly containing the fuel vapor) is separated in the permeation chamber 105*c*. At this time, because there has already been a sufficient pressure difference between the receiving chamber 105*b* and the permeation chamber 105*c*, it is able to ensure a high separation efficiency immediately after the fuel vapor containing gas is introduced into the separation membrane module 105. The concentrated gas flows into the aspirator 104 through the concentrated gas pipe 117 and the recovery pipe 115 and then is discharged from the aspirator 104 into the fuel tank 101 together with the fuel F. On the other hand, a diluted gas (mainly containing air), which has not passed through the separation membrane 105*d* and remains in the receiving chamber 105*b*, is introduced into the air intake pipe 130 through the diluted gas pipe 116. At this time, the engine is not running, so that the throttle valve 131 is closed completely. Because the diluted gas pipe 116 is connected to the air intake pipe 130 between the throttle valve 131 and the air filter 132, the diluted gas is released into the atmosphere through the air filter 132. Accordingly, the fuel tank 101 is depressurized, and the internal pressure of the fuel tank 101 gradually decreases. In this state, an opening ratio of the second introducing pipe valve 121 is controlled depending on changes in the internal pressure of the fuel tank 101.

If the second introducing pipe 121 is always opened completely, as the internal pressure of the fuel tank 101 increases, the volume of the fuel vapor containing gas supplied to the separation membrane module 105 increases. Under such circumstances, it is difficult to stabilize the separation efficiency of the fuel vapor by the separation membrane 105*d* because the separation membrane 105*d* has a characteristic that the separation ability lowers and the volume of the fuel vapor remaining in the diluted gas increases as the gas volume supplied to the separation membrane 105*d* increases as shown in FIG. 3. Thus, in a condition that the internal pressure of the fuel tank 101 is high, the large amount of the fuel vapor remains in the diluted gas. If such diluted gas is released into the atmosphere, the air is polluted. Therefore, it is necessary to control the gas volume supplied to the separation membrane 105*d* to the standard supply quantity Qs based on the characteristic shown in FIG. 3 such that the fuel vapor remaining density in the diluted gas is less than the predetermined density Ds. The predetermined density Ds is determined such that the density Ds substantially does not lead to air pollution, i.e., the diluted gas with the predetermined density Ds has little fuel vapor. For example, the density Ds is set less than approximately 1% by volume. The characteristic as for the relationship between the gas supplied volume and the fuel vapor remaining density varies depending on a kind or a shape of the separation membrane 105*d*.

On this premise, the ECU 135 stores data as for relationship between the internal pressure of the fuel tank 101 and the opening ratio of the second introducing pipe valve 121 as shown in FIG. 12 for keeping the gas volume supplied to the separation membrane 105*d* at the standard supply quantity Qs. In addition, feedback control of the second introducing pipe valve 121 (flow control valve) depending on alteration of the internal pressure of the fuel tank 101 is carried out based on the internal pressure-opening ratio characteristic. In particular, when the internal pressure of the fuel tank 101 is high, the opening ratio of the second introducing pipe valve 121 is decreased. Then, as the internal pressure of the fuel tank 101 decreases, the opening ratio of the second introducing pipe valve 121 is increased. Thus, it is able to control the volume of the fuel vapor containing gas supplied to the separation membrane module 105 depending on the internal pressure of the fuel tank 101, and the fuel vapor remaining density in the diluted gas becomes stable at the predetermined density Ds. Because the predetermined density Ds is determined at a sufficiently-low density, it is able to avoid air pollution during decompression. In this embodiment, the second introducing pipe valve 121 is composed of a solenoid valve. Accordingly, the second introducing pipe valve 121 is repeatedly opened and closed at high speed, and the opening ratio of the second introducing pipe valve 121 is controlled based on open time/ (open time+closed time) defined as duty ratio. When the pressure sensor 136 detects sufficiently-low pressure in the fuel tank 101 less than a reference pressure, the fuel pump 102 is stopped and each valve is returned to its initial condition (at point $T_3$). Although this reference pressure is not also limited to a specific value, the reference pressure is preferably as low as possible. For example, the reference pressure is set at atmospheric pressure, preferably 0 Pa. Although it is preferable that the pressure sensor 136 and the negative pressure sensor 137 always measure the internal pressure of the fuel tank 101 and the negative pressure, respectively, the pressure sensor 136 and the negative pressure sensor 137 may work periodically at predetermined intervals.

On the other hand, the second introducing pipe valve 121, the branch pipe valve 124 and the recovery pipe valve 125 are opened when the engine is running. In this state, the fuel vapor vaporized in the fuel tank 101 is separated and concentrated in the separation membrane module 105 and then is returned into the fuel tank 101 via the aspirator 104 in the same manner as the decompression during the shutdown of the engine. In addition, because the recovery pipe valve 125 is opened, the negative pressure generated in the aspirator 104 affects on the canister 103. Thus, the fuel vapor adsorbed onto the adsorbent C is desorbed. The desorbed fuel vapor is suctioned into the aspirator 104 through the recovery pipe 115 and is discharged into the fuel tank 101 together with the fuel F and the concentrated gas. That is, the fuel vapor processor of this embodiment is one of purge-less evaporation systems. On the other hand, the diluted gas, which has not passed through the separation membrane 105d and remains in the receiving chamber 105b, is introduced into the canister 103 through the diluted gas pipe 116 for removing the fuel vapor from the canister 103. Accordingly, it is able to facilitate removal of the fuel vapor from the canister 103.

Figure 13:
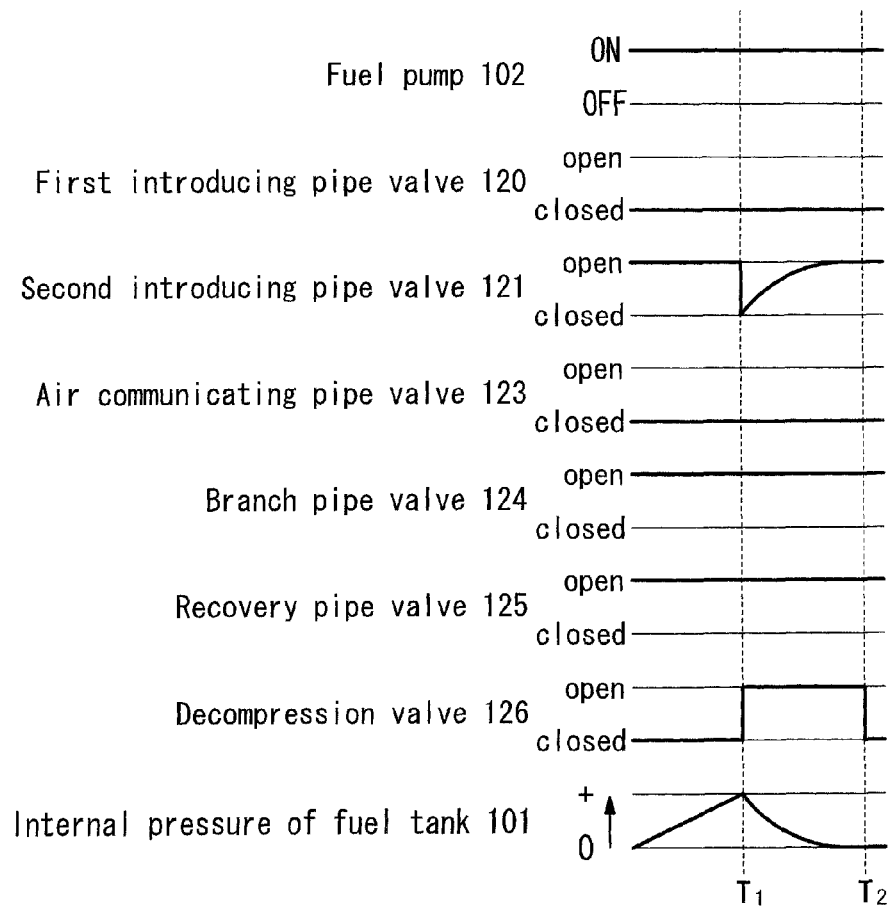
FIG. 13 is graphs showing timings for opening and closing valves and alteration of pressure.

While the engine is running, the temperature of the fuel F can increase due to ambient temperature or heat emitted from the fuel pump 102, etc. Therefore, in a condition that the fuel vapor is processed while the engine is running, the internal pressure of the fuel tank 101 can increase. Accordingly, when the internal pressure of the fuel tank 101 increases over a reference pressure while the engine is running, it is necessary to decompress the fuel tank 101. This reference pressure would be equal to the reference pressure for the engine shutdown condition. Hereafter, decompression control in the condition that the engine is running will be described with reference to FIG. 13. FIG. 13 shows timings for opening and closing each valve for decompression and alteration of pressure in the condition that the engine is running.

When the pressure sensor 136 detects the internal pressure of the fuel tank 101 more than the reference pressure while the engine is running, the decompression valve 126 is opened and the opening ratio of the second introducing pipe valve 121 is controlled depending on alternation of the internal pressure of the fuel tank 101 (at point $T_1$). Here, because the engine is running, the fuel pump 102 is also working. In addition, because the processor is working for processing the fuel vapor, there is a pressure difference between the receiving chamber 105b and the permeation chamber 105c in the separation membrane module 105. Thus, for the decompression operation in the condition that the engine is running, it is not necessary to wait until the negative pressure adequately affects on the permeation chamber 105c of the separation membrane module 105.

In the same manner as the decompression during shutdown of the engine, the feedback control of the opening ratio of the second introducing pipe valve 121 (flow control valve) is carried out depending on the internal pressure of the fuel tank 101 based on the internal pressure-opening ratio characteristic, which has been stored in the ECU 135 and is shown in FIG. 12, such that the gas volume supplied to the separation membrane 105d is kept at the standard flow quantity Qs. The opening ratio of the second introducing pipe valve 121 in this state is also controlled based on open time/(open time+closed time) defined as duty ratio. Accordingly, the fuel vapor remaining density in the diluted gas is stable at the predetermined density Ds. In addition, the diluted gas is introduced into the air intake pipe 130 through the diluted gas pipe 116, and the fuel tank 101 is depressurized. In this condition, because the engine is running, the diluted gas is suctioned into the engine. Because the fuel vapor remaining density in the diluted gas is stable, air-fuel ratio in the engine is also stable, thereby avoiding increase in emissions contained in exhaust gas. Then, when the pressure sensor 136 detects sufficiently-low pressure in the fuel tank 101, each valve is opened or closed for processing the fuel vapor (at point $T_2$).

Here, it is not absolutely necessary to conform the predetermined density Ds of the fuel vapor in the diluted gas for decompression during running of the engine to the predetermined density Ds for decompression during shutdown of the engine. The predetermined density Ds must be determined as low as possible during shutdown of the engine in order to prevent air pollution. Whereas, in the condition that the engine is running, because the object is to prevent increase in emissions contained in the exhaust gas, the predetermined density Ds may be relatively high in a condition that the fuel vapor remaining density in the diluted gas is stable. However, in a case that the predetermined density Ds and the opening ratio of the second introducing pipe valve 121 depending on this predetermined density Ds are changed depending on whether the engine is running or not, required control programs become significantly complex. Therefore, the predetermined densities Ds in both cases preferably are equal to each other The fuel introduction regulator can be provided to the aspirator 104 in the same manner to the needle valve 47 of the first and the second embodiments. Because such configuration has been explained above in reference to the FIG. 8, detailed explanation as for this alteration will not be described.

Although the opening ratio of the second introducing pipe valve 121 is not controlled during processing of the fuel vapor in this embodiment, the opening ratio of the second introducing pipe valve 121 can be controlled during the processing of the fuel vapor. In this case, when the predetermined density Ds in the condition that the engine is running is determined to be equal to the predetermined density Ds during shutdown of the engine, i.e., a density where there is little fuel vapor (e.g., less than 1% by volume), it is able to decrease the fuel vapor density in the diluted gas introduced into the canister 103. In addition, when the predetermined density Ds is set in this manner, the end of the diluted gas pipe 116 may be opened to the atmosphere in order to release the diluted gas into the atmosphere. In this case, the diluted gas pipe 116 may be branched such that a branched end is opened to the atmosphere. The branched pipe may have a solenoid valve, which is controlled by the ECU 135 for opening and closing the branched pipe. In the above embodiment, a three-way valve can be provided at the branching point instead of the decompression valve 126. The negative pressure sensor 137 can be disposed on the concentrated gas pipe 117.

In the third embodiment, the second introducing pipe valve 121 is disposed between the fuel tank 101 and the receiving chamber 105b. Thus, it is able to supply the fuel vapor containing gas to the separation membrane module 105 depending on the internal pressure of the fuel tank 101 by controlling the opening ratio of the second introducing pipe valve 121. Accordingly, it is not necessary to provide any pumps or the like to actively provide the fuel vapor containing gas to the separation membrane module 105, thereby preventing the processor from becoming larger.

The invention claimed is:
1. A fuel vapor processor comprising:
a fuel tank configured to reserve fuel;
a canister containing adsorbent capable of adsorbing fuel vapor vaporized in the fuel tank;

a separator receiving a fuel vapor-containing gas from the fuel tank and selectively passing the fuel vapor therethrough in order to divide the fuel vapor-containing gas into a first gas mainly containing the fuel vapor and a second gas having a fuel vapor density lower than the first gas;

a regulator controlling the volume of the fuel vapor-containing gas supplied to the separator;

and a suction unit configured to remove the fuel vapor from the canister and to suction the first gas from the separator in order to return the first gas into the fuel tank;

wherein the second gas is introduced into the canister or is released into the atmosphere; and wherein the volume of the fuel vapor-containing gas supplied to the separator is determined based on known characteristics of relationships between the volume of the fuel vapor-containing gas supplied to the separator and the fuel vapor density of the second gas.

2. The fuel vapor processor as defined in claim 1, further comprising
a fuel pump introducing the fuel from the fuel tank into the suction unit,
wherein the suction unit is composed of an aspirator receiving the fuel from the fuel pump in order to produce negative pressure therein, suctioning the fuel vapor adsorbed in the canister due to the negative pressure and discharging the fuel vapor into the fuel tank together with the fuel; and
wherein the regulator controls the flow volume discharged from the aspirator.

3. The fuel vapor processor as defined in claim 2, wherein the regulator controls the volume of the fuel vapor-containing gas supplied to the separator based on negative pressure-flow characteristic of the aspirator.

4. The fuel vapor processor as defined in claim 3, wherein the regulator is composed of a valve capable of controlling the gas volume suctioned into the aspirator.

5. The fuel vapor processor as defined in claim 4, wherein the valve is composed of a solenoid valve regulated by controlling a time ratio between an open state and a closed state of the solenoid valve.

6. A fuel vapor processor for a gas vehicle having an engine, comprising:
a fuel tank configured to reserve fuel;
a canister containing adsorbent capable of adsorbing fuel vapor vaporized in the fuel tank;
a separator receiving a fuel vapor-containing gas from the fuel tank and selectively passing the fuel vapor therethrough in order to divide the fuel vapor-containing gas into a first gas mainly containing the fuel vapor and a second gas having a fuel vapor density lower than the first gas;
a sensor detecting internal pressure of the fuel tank;
a regulator controlling the volume of the fuel vapor-containing gas supplied to the separator depending on the internal pressure of the fuel tank in order to stabilize the fuel vapor density of the second gas;
a suction unit capable of removing the fuel vapor from the canister and suctioning the first gas from the separator in order to return the first gas into the fuel tank; and
an air intake pipe for supplying air to the engine;
wherein the second gas is introduced into the air intake pipe; and
wherein the volume of the fuel vapor-containing gas supplied to the separator is determined based on the internal pressure of the fuel tank and known characteristics of relationships between the volume of the fuel vapor-containing gas supplied to the separator and the fuel vapor density of the second gas.

7. The fuel vapor processor as defined in claim 6, wherein the second gas is introduced into the air intake pipe when the internal pressure of the fuel tank is equal to or more than a predetermined value, and wherein the second gas is introduced into the canister when the internal pressure of the fuel tank is less than the predetermined value.

8. The fuel vapor processor as defined in claim 6, wherein the separator has a receiving chamber configured to receive the fuel vapor-containing gas, and wherein the regulator is composed of a valve disposed between the fuel tank and the receiving chamber of the separator.

9. The fuel vapor processor as defined in claim 6, wherein the separator has a permeation chamber configured to receive the first gas,
wherein the permeation chamber of the separator and the suction unit are communicated with each other, and
wherein the regulator controls the volume of the fuel vapor-containing gas supplied to the separator in a condition that the suction unit generates negative pressure affecting on the permeation chamber of the separator.

10. The fuel vapor processor as defined in claim 8, wherein the valve is composed of a solenoid valve, and wherein opening ratio of the valve is controlled based on open time/(open time+closed time).

11. The fuel vapor processor as defined in claim 10, further comprising
an engine control unit storing data as for relationship between the internal pressure of the fuel tank and the opening ratio of the valve and controlling the opening ration of the valve based on the data.

12. The fuel vapor processor as defined in claim 6, further comprising
a fuel pump configured to pump the fuel in the fuel tank to the engine,
wherein the suction unit is composed of an aspirator receiving the fuel discharged from the fuel pump in order to generate the negative pressure.

* * * * *